E. A. LYON.
ADVERTISING DEVICE.
APPLICATION FILED JUNE 2, 1906.

979,399.

Patented Dec. 20, 1910.
8 SHEETS—SHEET 1.

FIG. 1

E. A. LYON.
ADVERTISING DEVICE.
APPLICATION FILED JUNE 2, 1906.

979,399.

Patented Dec. 20, 1910.
8 SHEETS—SHEET 2.

FIG. 2

E. A. LYON.
ADVERTISING DEVICE.
APPLICATION FILED JUNE 2, 1906.

979,399.

Patented Dec. 20, 1910.
8 SHEETS—SHEET 3.

E. A. LYON.
ADVERTISING DEVICE.
APPLICATION FILED JUNE 2, 1906.

979,399.

Patented Dec. 20, 1910.

Witnesses
Max B. A. Doring
Lottie M. Garrick.

Inventor
E. Atherton Lyon.
By his Attorneys
Prindle and Williamson

E. A. LYON.
ADVERTISING DEVICE.
APPLICATION FILED JUNE 2, 1906.

979,399.

Patented Dec. 20, 1910.
8 SHEETS—SHEET 6.

FIG. 13

E. A. LYON.
ADVERTISING DEVICE.
APPLICATION FILED JUNE 2, 1906.

979,399.

Patented Dec. 20, 1910.
8 SHEETS—SHEET 7.

Witnesses:
F. P. Prindle.
A. Newcomb.

Inventor,
Elias A. Lyon,
by Prindle and Williamson,
Attys.

E. A. LYON.
ADVERTISING DEVICE.
APPLICATION FILED JUNE 2, 1906.

979,399.

Patented Dec. 20, 1910.
8 SHEETS—SHEET 8.

WITNESSES

INVENTOR

BY his ATTORNEYS

UNITED STATES PATENT OFFICE.

ELIAS ATHERTON LYON, OF YONKERS, NEW YORK.

ADVERTISING DEVICE.

979,399.

Specification of Letters Patent. Patented Dec. 20, 1910.

Application filed June 2, 1906. Serial No. 319,950.

*To all whom it may concern:*

Be it known that I, ELIAS ATHERTON LYON, of Yonkers, in the county of Westchester and in the State of New York, have invented a certain new and useful Improvement in Advertising Devices, and do hereby declare that the following is a full, clear, and exact description thereof.

The object of my invention has been to provide an advertising machine which is adapted to be connected with any manually operated machine, having a manually operated part, such as a telephone, so that when the said part is operated, my advertising machine shall also be operated to bring an advertisement to the attention of the person moving such manually operated part.

A further object of my invention has been to so construct my machine that it can be made to successively bring advertisements into view independently of such manually operated part if desired; and to such ends my invention consists in the advertising device hereinafter specified.

Reference is to be had to the accompanying drawings, in which—

In carrying my invention into practice, I preferably provide a case 1 having a window 2 through which advertisements are to be successively displayed. The case is to contain the mechanism of my advertising device, and can be placed in any convenient position. I have shown for illustration the use of my device in connection with a telephone, so that when the telephone is used in the normal way, such use shall cause my advertising device to move an advertisement into position, so that the user of the telephone will have his attention attracted by the moving advertisements. While the case 1 can be placed in any desired position, I have illustrated it as placed upon the top of a telephone battery case 3. Within the case 1 is a machine for moving the advertisements into view. The said machine consists of a base plate 4 from which rises end plates 5 and 6. Rollers 7 and 8 are journaled in the side plates, and the ends of the band 9 having advertisements thereon, are secured to the said rollers in any convenient manner, so that said band can be wound up on said rollers. As I have illustrated, the ends of the band are turned about wires 10, that are crowded into slots in the said rollers. The band passes over rollers 11 and 12 which are journaled between the said plates and in such position as to carry the band beneath the window. The shafts of the rollers 7 and 8 are respectively provided with ratchet-wheels 14 and 13, having oppositely directed teeth. Pawl levers 15 and 16 for the ratchet-wheels 13 and 14 respectively, are pivoted upon the side plate 6. The said levers respectively carry pawls 17 and 18, which pawls have arms that are engaged by springs 19 and 20 respectively, so that the pawls are normally held in contact with the ratchet-wheels. Pins 20' and 21 are secured to the plate 6 in such position as to be respectively engaged by the said arms of the pawls 17 and 18 when the levers 15 and 16 are at the backward limit of the strokes, and the action of the pins is then to withdraw the said pawls from contact with the ratchet-wheels, so that said wheels can, as later described, turn backward. The backward movement of the levers 15 and 16 is caused by springs 22 and 23 respectively, and is limited by pins 24 and 25 respectively, on the plate 6. The levers 15 and 16 are operated by a polarized armature 26, the said armature operating the lever 15 only when it moves from a central position downward and operating the lever 16 when it moves from a central position upward. The armature 26 is pivoted to the cross-bar 27 of a bi-polar-magnet core, said core having rods 28 and 29 that pass through spools or coils 30 and 31, respectively, and said rods 28 and 29 have pole-pieces 32 and 33, respectively, which terminate above and below the polarized armature. The polarized armature is pivoted to the bar 27 and passes loosely through a spool or coil 34. Stop pins 17' and 18' respectively prevent the overthrow of the pawls 17 and 18.

Figure 1:
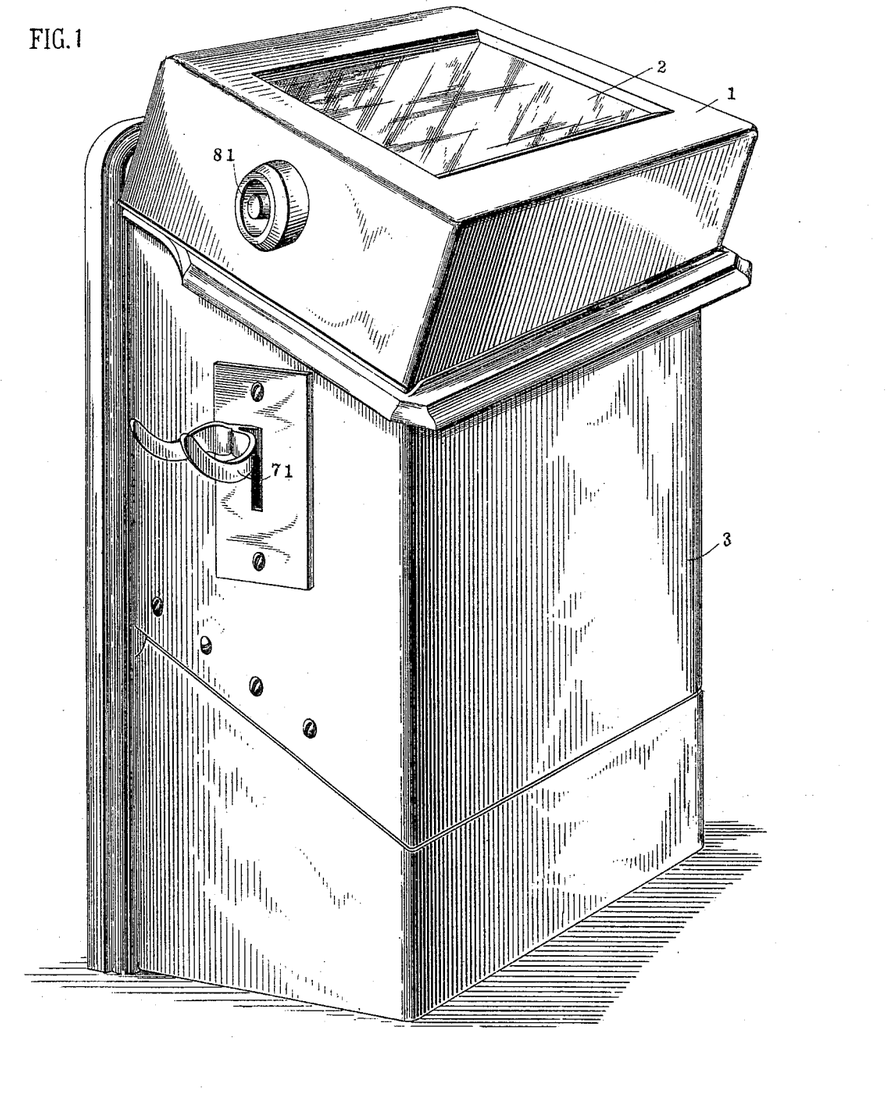
Figure 1 is a perspective view of a portion of a telephone case, having an advertising device involving my invention applied thereto.
Figure 2:
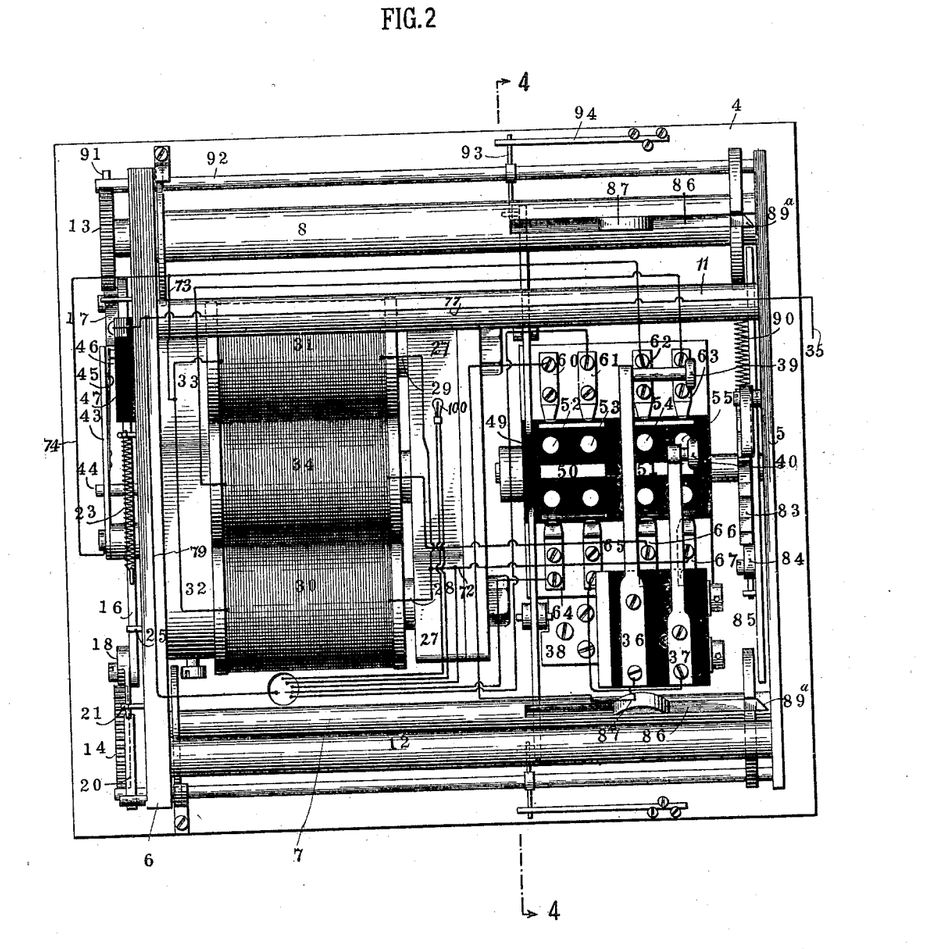
Fig. 2 is a plan view of a machine involving my invention, the machine being removed from the case, and the band of advertisements being removed from the machine.
Figure 3:
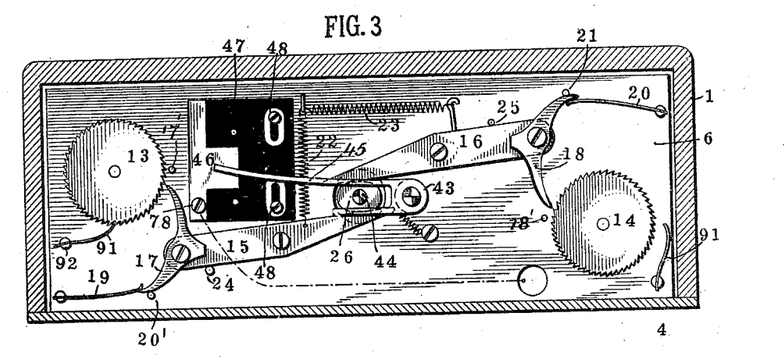
Fig. 3 is an end view of said machine, the case being shown in section.
Figure 4:
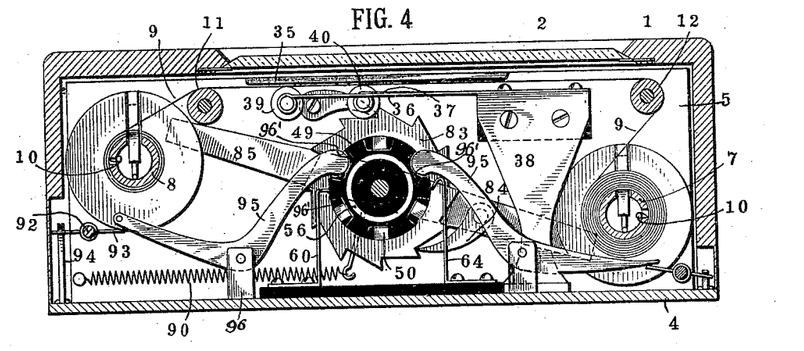
Fig. 4 is a section taken on the line 4—4 of Fig. 2 looking in the direction of the arrows.
Figure 5:
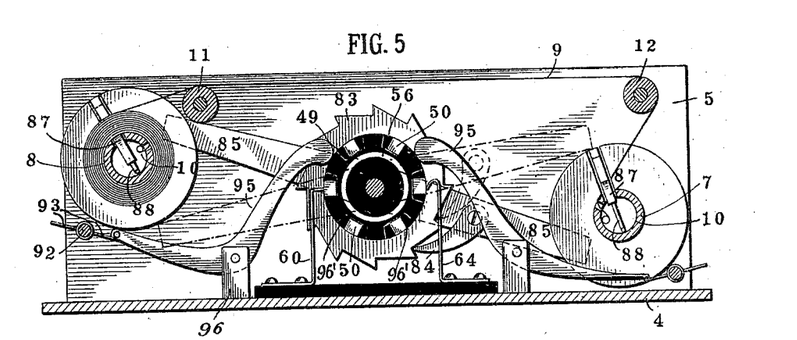
Fig. 5 is a vertical sectional view of the reels and pawl mechanism shown in Fig. 4 (illustrating the said parts in a different relative position), only those parts being shown in Fig. 5 which are necessary to illustrate said different position of the parts of the pawl mechanism.
Figure 6:
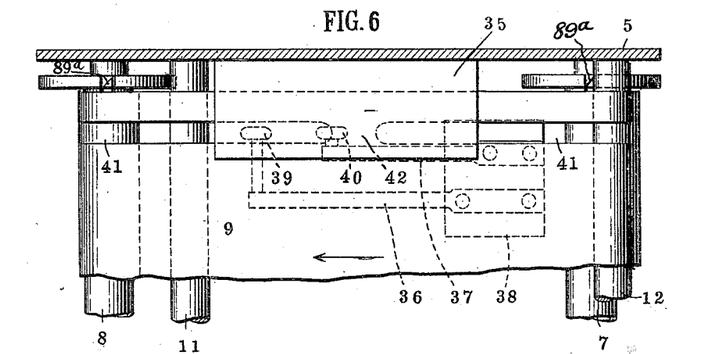
Fig. 6 is a plan view with a portion of the band of advertisements in place.
Figure 7:
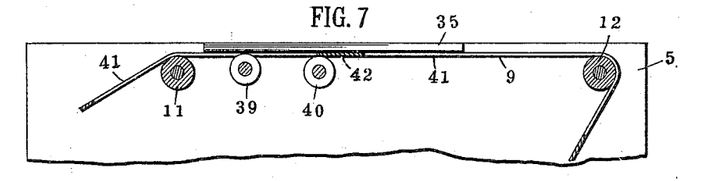
Fig. 7 is a partial vertical sectional view showing a portion of the band, and the guiding and contact rollers.

The band 9 passes beneath a metal plate 35 that is secured to the side plate 5, but which does not project far enough inward to interfere with the view through the window. Spring arms 36 and 37 are secured to the bracket 38, and are provided with rollers 39 and 40 respectively, which, as later described, are in circuit with the magnet and armature coils, the said rollers being in line with a series of slots 41 formed in the band 9, the said slots being interrupted by sections 42 of the band, so that, when the rollers 39 or 40 are over a section 42 of the band and the contact roller is separated from the plate 35, the circuit is broken, while a slot 41 permits such rollers to contact with the plate 35 and complete the circuit. The circuit is provided with a circuit breaker consisting of a forked lever 43, whose fork receives a pin 44 on the polarized armature, the fork being larger than the pin so that considerable play is permitted. The lever 43 has a spring contact arm 45 that bears upon a plate 46 which is in the electric circuit. The plate 46 is set into a piece of non-conducting material 47, so that when the arm 45 is over the plate 46, the circuit is closed, and when said arm is over the plate 47, the circuit is open. For convenience, the plate of non-conducting material 47 is secured to the side plate 6 by screws 48 passing through slots of the plate 47, so that the plates 46 can be adjusted under the circuit breaker.

As I desire to have the band wound up upon one roller, and then automatically reversed and wound upon the opposite roller, I provide a contact cylinder 49 having two kinds of contact points arranged in alternate series around its periphery. For convenience I have illustrated six of each of the two kinds of contact points. One kind consists of bars 50 and 51 laid in grooves running longitudinally of the cylinder. The other kind of contact point consists of plugs 52, 53, 54, and 55, set into the cylinder and respectively contacting with metal rings 56, 57, 58, and 59 within the cylinder, and sufficiently small so as not to contact with the bars 50, and 51. Upon the opposite sides of the cylinder 49 are four contact springs, 60, 61, 62, 63, 64, 65, 66 and 67, each of which springs is in line with one of the series of plugs 52, 53, 54, or 55. The electrical connections between the various parts will best be understood by reference to Figs. 11 and 12. The battery 70 is connected to the spring 67 and to the pivot of the ordinary receiver-hook 71 of the telephone. The spring 67 is also connected by a wire 72 to the spools 30 and 31 of the magnet, the opposite end of the coil 30 being connected by a wire 73 with a wire 74 running from the arm 43 to the spring 62, and the opposite end of the coil 31 being connected with the arm 43. The ends of the coil 34 of the polarized armature are connected to springs 63 and 66. The spring 60 is connected to the roller 39. The spring 65 is connected to the roller 40, and the springs 61 and 64 are respectively connected to upper and lower contacts 75 and 76 that are adapted to be engaged by the receiver-hook 71. The plate 35 is connected by a wire 77 with the screw 78 of the contact plate 46, and is also connected by a wire 79 with the contact 80 of a push button 81, the latter being connected by a wire 82 with the battery.

Figure 8:
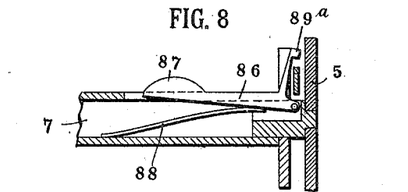
Fig. 8 is a detail of a reversing pawl.
Figure 9:
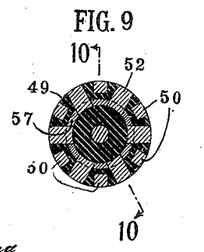
Fig. 9 is a sectional view of the contact cylinder on the line 9—9 of Fig. 10.
Figure 10:
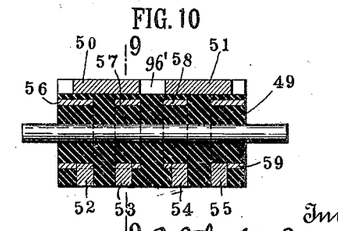
Fig. 10 is a cross section on the line 10—10 of Fig. 9.

In order to cause the rotation of the contact cylinder 49 at each end of the travel of the band, and thus to cause a reversal of the travel of band, such cylinder is provided with a ratchet-wheel 83 that is engaged by a pawl 84 on a double-ended lever 85. The rollers 7 and 8 are each provided with a pawl 86 that is pivoted within the roller and that has a projection 87 which is thrown outward by a spring 88 when the band has sufficiently unwound to uncover a slot 89 formed therein. When the projection 87 is thus permitted to rise, a tooth 89$^a$ on the pawl comes in contact with one end of the lever 85, and retracts said lever against the stress of a spring 90. When the tooth 89$^a$ has passed the end of the lever, the spring 90 advances the lever, causing the pawl 84 to turn the contact cylinder the space of one tooth in the ratchet-wheel 83. The tooth 89$^a$ is beveled so that, on a backward movement of its respective cylinder, it will not engage with the lever 85. When the band is wound up upon the cylinders 7 and 8, it covers slot 89 and retracts the tooth 89$^a$. It will be obvious that the pawl 86 could be used in other relations than that in my machine. For instance it could be used to indicate when any band has been unwound to a given point, or completely unwound. The ratchet-wheel 13 is provided with a pawl 91 to prevent its retraction. The pawl consists of a spring arm mounted on a shaft 92 which latter is journaled in the side plates 5 and 6. The shaft 92 has a cross-arm 93, one end of which is borne upon by a spring 94, and the other end of which is engaged by a lever 95 fulcrumed on a stud 96 on the base-plate, the opposite end of the lever 95 being adapted to engage pockets 96' formed in the contact cylinder 49. When the contact cylinder is turned, the rounded end of the lever 95 rides out of the pocket 96', depresses the corresponding end of the cross-arm 93 against the stress of the spring 94, and releases the pawl 91. For the ratchet-wheel 14 a similar arrangement is provided which need not be described.

Figure 11:
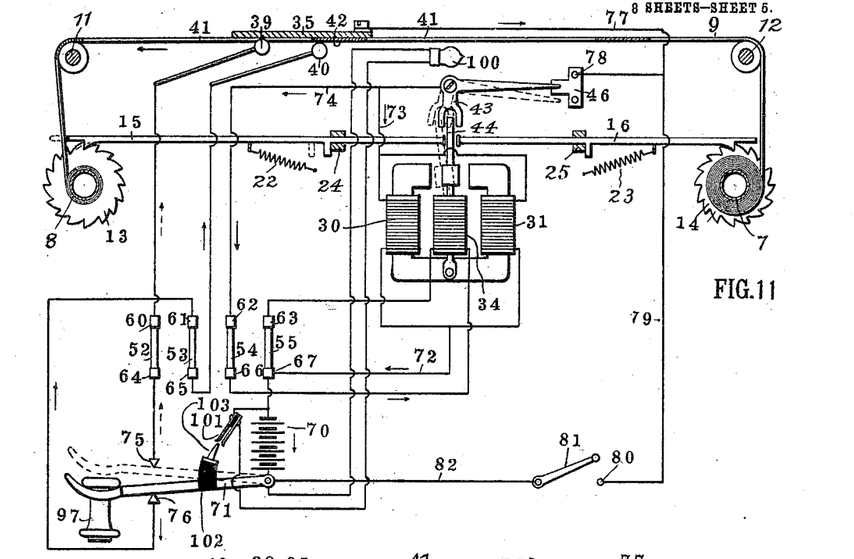
Figs. 11 and 12 are diagrammatic views showing the circuits and the parts coöperating therewith.

In the operation of the above illustrated embodiment of my invention, the parts will first be assumed to be in the position illustrated in Fig. 11, the band moving to the left. When the receiver 97 is removed from the receiver-hook, the latter is raised by its usual spring and touches the contact 75. The current then passes from the battery through the receiver-hook, through the contact 75 to the spring 64, and by one plug 52 to another making contact with the spring 60. From the spring 60 the current passes to the roller 39, which, being in a slot 41, makes contact with the plate 35. The current then passes by the wire 77 to the plate 46, thence to the circuit breaker and to the wire 74. The current here divides, part of it passing to the spring 67 by way of the wire 73 and coil 30, and part of it passing by the wire 74 to the spring 62, across from one block 54 to another, and thence to the spring 66 through the coil 34 to the spring 63, through the blocks 55 to the spring 67. Thus both the coil 30 and the polarized armature are energized, the operative end of the armature being made a south pole, while the pole energized by the wire 30 is made a north pole. In this position the armature will vibrate from its middle position in Fig. 11 to the left as a result of the presence of the circuit breaker, operating the roller 8 through its pawl lever 15 and causing the band to be wound up upon said roller until the section 42 of the band has passed between the roller 39 and the plate 35, thus breaking the contact. This movement, it will be seen, is relatively short, and is intended to be so to prevent my machine from operating after the user of the telephone has gotten the attention of the central operator.

The parts remain in this position while the telephone is being used. When the user replaces the receiver on the hook 71, the hook is depressed into position to touch the lower contact 76. The current then passes from such contact to the spring 61, and thence through the plugs 53 to the spring 65 and to the roller 40, which is now in contact with the plate 35 as the distance between the two contacts 39 and 40 is greater than the distance between the slots in the band. The current thence passes through the armature and magnet coils as before described, and the travel of the band to the left is continued until the necessary next section 42 of the band is interposed between the roller 40 and the plate 35, when the machine again stops. The contacts are farther apart than the length of the sections 42, because otherwise both contacts would be disconnected at the same time and the machine would be unable to start. If the user wishes to see the band move without reference to the use of a telephone he closes the push-button, 81, and the current, instead of passing through the roller 39 or 40 to the plate 35, reaches the circuit breaker by the wires 82 and 79 directly. So long as the push-button is depressed the movement of the band will be continued.

Figure 12:
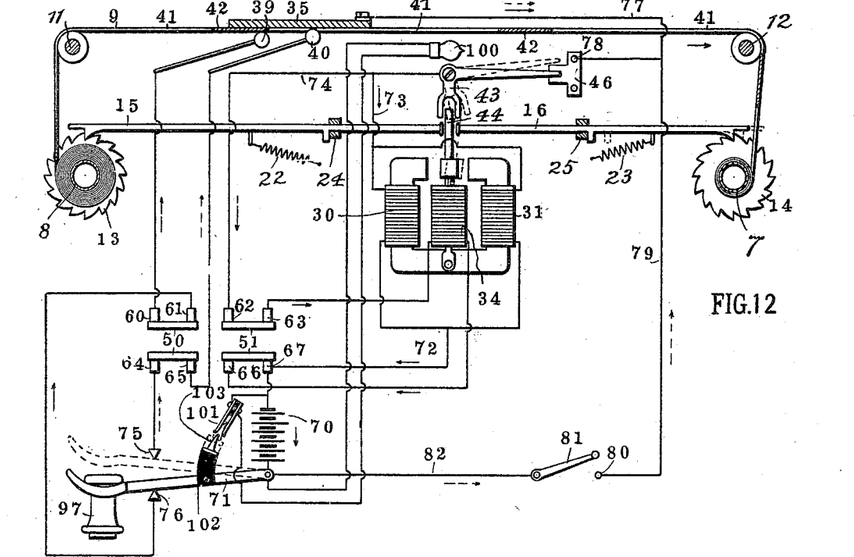

When the band has been sufficiently unwound from the roller 7 so that the pawl 86 is released by the uncovering of the slot 89, the tooth 89$^a$ engages the lever 85 and turns the contact cylinder the space of one tooth so that the contact springs are connected as illustrated in Fig. 12. The turning of the cylinder through the lever 85 causes the retaining pawl 91 of the ratchet-wheel 13 to be retracted, and the retaining pawl 91 of the ratchet-wheel 14 to be engaged. The pawls 91 are operated through the action of the levers 95. If now the receiver be removed from the receiver-hook, the latter will rise and touch the upper contact 75, and the current will pass from the spring 64 to the spring 65 through a bar 50, and thence to the roller 40, which being in a slot 41, contacts with the plate 35 and permits the current to pass through the circuit-breaker and through the magnet coils to the spring 67 and back to the battery as before. The current in the polarized armature however, must be reversed, and this is accomplished by taking the current from the wire 74 through the spring 62 to the spring 63 by a bar 51. The current thence passes through the armature coil 34 and back to the spring 66 from whence it passes to the battery through the other bar 51. The polarized armature then vibrates to the right and causes the ratchet-wheel 14 to be operated through its lever 16 winding up the band on the roller 7 until the section 42 passes between the roller 40 and the plate 35. The machine will then stop. When the receiver is replaced in the receiver-hook, the latter is depressed into touch with the lower contact 76 and the current then passes to the spring 61, and through the bar 50 and spring 60 to the roller 39, which, being in a slot 41, makes contact with the plate 35 and causes the further travel of the band to the right until the next section 42 is interposed between the roller 39 and the plate 35.

It will be noticed that in traveling to the right, the band stops in a slightly different position from what it occupies in traveling to the left. This being due to the length of the section 42 and the distance between the rollers 39 and 40. I, therefore, place a short advertisement 98 between each two long advertisements 99, so that the short advertisements are shown above the long advertisements just previous to the short movement of the band when going in one direction, and are shown below the long advertisements when going in the other direction.

In order that my device may be used in dark places, I place an electric light 100, within the casing, and connect it in circuit with the battery and with a pair of contact springs 101. The receiver-hook is provided with a block 102 of non-conducting material that carries a blade 103 of conducting material which is inserted between the springs 101 by the rising of the hook, so that when the receiver is taken off the hook, the rising of the hook will cause the light to shine.

It is obvious that various changes can be made in the above illustrated construction which will be within the spirit of my invention, and I do not desire to be limited beyond the language of my claims and the requirements of the prior art.

Figure 14:
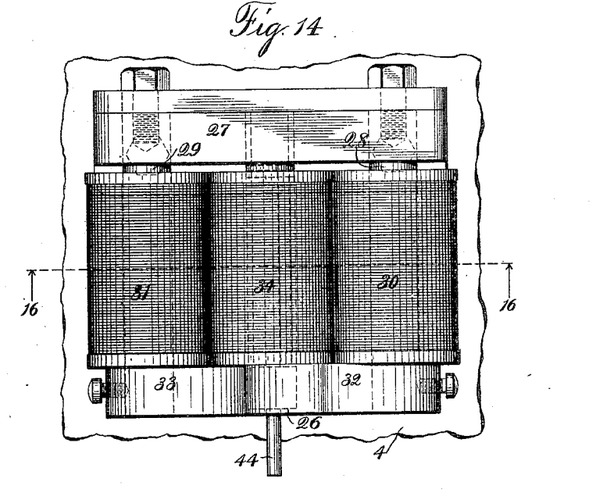
Figs. 14, 15 and 16 are respectively a plan view, an end elevation, and a transverse sectional view of the polarized armature mechanism.
Figure 15:
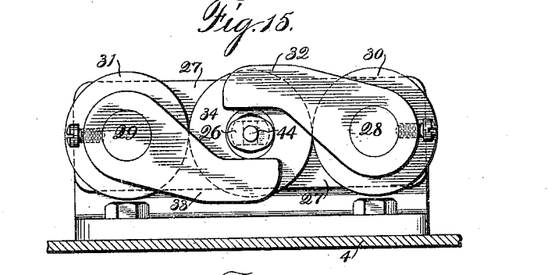
Figure 16:
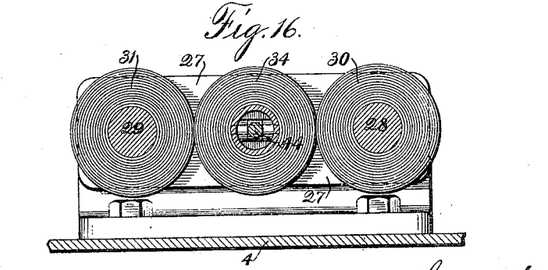
Figure 17:
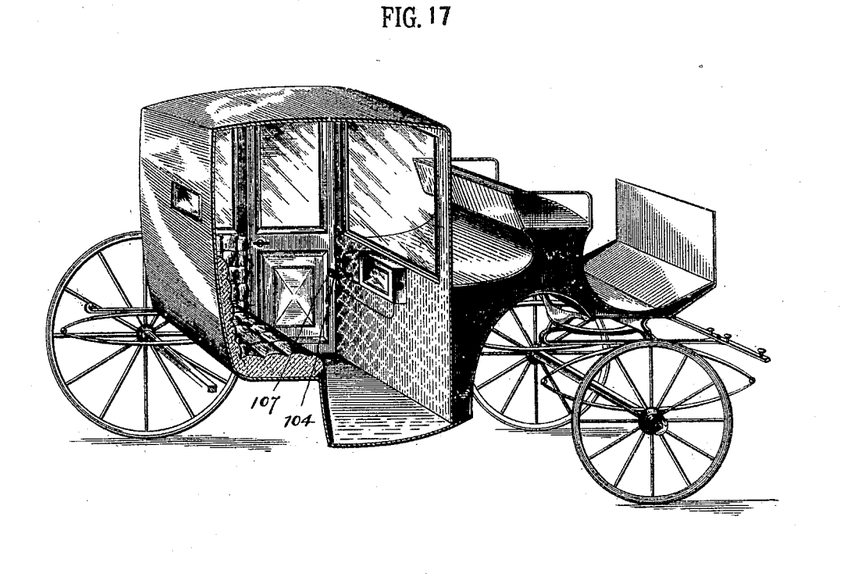
Fig. 17 is a partial sectional view of a carriage embodying my invention.
Figure 18:
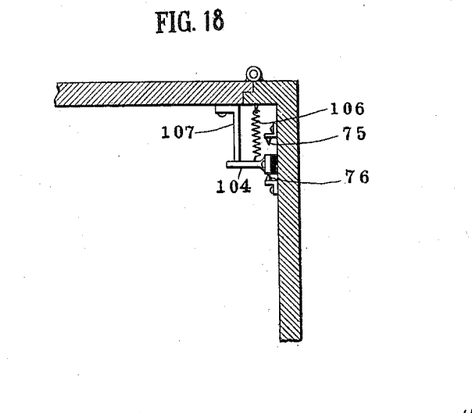
Fig. 18 is a sectional view showing the contact devices of Fig. 17.

As another embodiment in my invention I have shown in Figs. 14 and 15 a carriage provided with an advertising machine in such position that a person seated in the carriage will face the machine, and upon closing the door the machine will be set in operation and thus attract the attention of the person on the seat to the advertisements. A lever, 104, is hung upon the front wall of the carriage, which lever corresponds in all respects to the lever 71 previously described. The lever hangs between the contacts 75 and 76 and is drawn toward the door by a spring 106. When the door is closed a lug 107 on the door swings the lever against the contact 76, stretching the spring.

In the operation of the device, the closing of the door makes contact between the lever 104 and the contact 76 and causes the advertising machine to make its short step (or its long one if preferred). When the door is opened the spring throws the lever against the contact 75 and causes the machine to make another step of the advertisements. If desired, the entire movement of the advertisement may take place upon the closing of the door.

The placing of my advertising machine in front of a seat in an inclosure such as a carriage or the water closet of a hotel and causing it to be operated by the door is an exceedingly advantageous arrangement for displaying advertisements. The person upon the seat cannot fail to have his attention attracted by the advertisements as the door is closed. He can then by means of the button 81 cause the whole succession of advertisements to pass before him if he desires.

Figure 13:
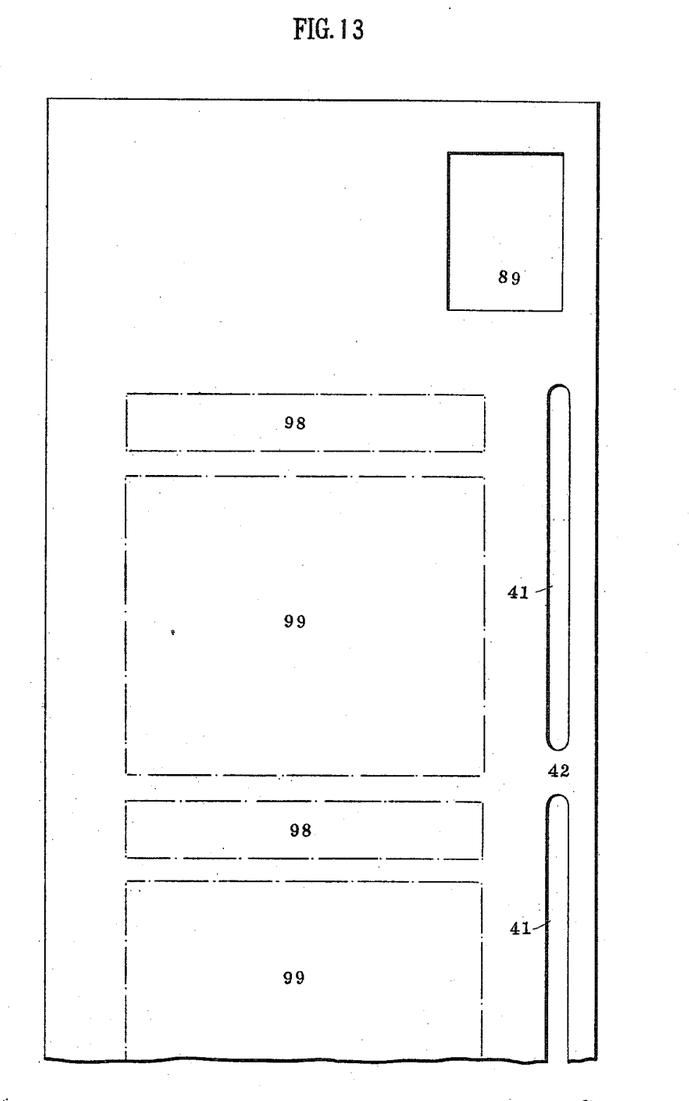
Fig. 13 is a plan view of a portion of the band of advertisements used in my said machine.

In either of the forms described I at times find it especially desirable to move the band containing the advertisements for a short distance when the same is first actuated by the observer and then subsequently upon an appropriate movement of the observer to cause the band to be moved a longer distance. The former movement could be adapted in such a way that it would result in moving a short advertisement, such as that marked "98" in Fig. 13, from the field of vision. This would result in attracting the observer's attention. The latter movement referred to could then take place subsequently so as to move a longer advertisement, such as that marked "99" in Fig. 13, from the field of vision, so as to be replaced by fresh advertisements, with the result that a subsequent observer or the same observer when beginning to actuate the device all over again, would have a fresh advertisement spread out before him. Such an arrangement could be readily effected with the telephone modification which I have above described by causing the removal of the receiver from the hook of the telephone to move the band sufficiently far to cause the advertisement marked "98" to move from the field of vision, and then when the receiver is again placed upon the hook, to cause a longer advertisement, such as that marked "99" to move from the field of vision. This arrangement is especially advantageous in telephones, for the reason that the movement of the band of advertisements for a small distance operates as a signal to attract the attention of the user of the telephone during the time he is waiting to get "Central". After the attention of the user has been attracted in this way and "Central" has made the required connection with the party asked for over the telephone, a large advertisement will be spread out upon the band of advertisements which is now stationary, so that the same can be readily examined by the user of the telephone. The interval of time during which the attention of the user is being attracted in this manner is so short that this initial movement is entirely completed before central connects with the desired party.

I claim:—

1. In an advertising device, the combination of a band having advertisements thereon, a roller to which one end of said band is attached, a ratchet-wheel connected with said roller, a retaining tooth or pawl adapted to prevent retrograde movement of said ratchet-wheel, and means operated by the unwinding of the band for releasing said retaining pawl when the band has been unwound.

2. In an advertising device, the combination of a band having advertisements thereon, means for winding up each end of said band, and a controlling mechanism for controlling the operations for each of said means, said controlling mechanism comprising a series of springs in electrical connection with said actuating mechanism, a cylinder in contact with said springs, and insulated conductors laid in the surface of said cylinder and adapted to connect the various springs to cause the winding mechanism to be actuated in one or the other direction, said conductors consisting of bars extending transversely of the cylinder, and blocks between said bars, said blocks being connected under said bars.

3. In an advertising device, the combination of a band having advertisements thereon, a roller for each end of the band, a ratchet-wheel for each roller, means for actuating said ratchet-wheels to wind up said band, pivoted retaining pawls to prevent said band from unwinding, an electric mechanism for actuating said mechanism for winding up said band, a controlling mechanism for said actuating mechanism, said controlling mechanism consisting of a series of springs in electric connection with said actuating mechanism, and of a cylinder having insulated conductors thereon for making proper connections between said springs, levers adapted to release said retaining pawls, and cam surface formed on said cylinder adapted to operate said levers, and mechanism for turning said cylinder at each end of the travel of the band.

4. In an advertising device, the combination of a band having advertisements thereon, pawl and ratchet mechanisms for winding up each end of the band, a controlling mechanism for said pawl and ratchet mechanisms, pivoted retaining pawls for said pawl and ratchet mechanisms, levers adapted to release said retaining pawls, a controlling mechanism for said pawl mechanisms, and a cam surface carried by said controlling mechanism and adapted to move said levers.

5. In an advertising device, the combination of a band having advertisements thereon, mechanism for winding up each end of the band, a polarized armature for actuating one or the other of said mechanisms, and a forked circuit breaker interposed in the circuit of said armature, said armature having a pin that is adapted to enter said fork, said fork being wider than said pin.

6. In an advertising device, the combination of a band having advertisements thereon, means for winding up each end of said band, a polarized armature normally occupying a central position and adapted, when moved in one direction therefrom, to actuate one of said winding mechanisms, and when moved in the other direction therefrom to actuate the other of said winding mechanisms, a forked contact lever, a pin on said armature occupying said fork, a plate which said contact lever is adapted to touch when in mid-position, said plate being in electric connection with said armature, and being narrow enough so that said contact lever is not in touch therewith in either extreme position to which it is carried by said armature.

7. In an advertising device, the combination of a band having advertisements thereon, electric mechanism for winding up either end of said band, a plate on one side of said band and contacts on the other side thereof, said plate and contacts being in circuit with said mechanism, said band having long slots and short interruptions that are respectively adapted to permit said contacts to reach said plate and to prevent such action, said contacts being farther apart in the direction of travel of the band than the length of said interruptions between the slots.

8. In an advertising device, the combination of a band having advertisements thereon, two rollers one for each end of the band, electric mechanism for turning said rollers to wind said band in opposite directions, a contact cylinder, and connections whereby by rotating said cylinder into different successive positions, said electric mechanism can be made to operate one or the other of said rollers, a ratchet wheel carried by said cylinder, a double-ended lever carrying a pawl for operating said ratchet-wheel, and a latch pivoted in each roller, said latches normally standing above the surfaces of said rollers and when in such position having teeth that are adapted to engage said pawl lever.

9. In an advertising device, the combination of a band having advertisements thereon, two rollers one for each end of the band, electric mechanism for turning said rollers to wind said band in opposite directions, a contact cylinder and connections whereby by rotating said cylinder into different successive positions, said electric mechanism can be made to operate one or the other of said rollers, a ratchet wheel carried by said cylinder, a double-ended lever carrying a pawl for operating said ratchet-wheel, and a latch pivoted in each roller, said latches normally standing above the surfaces of said rollers and when in such position having teeth that are adapted to engage said pawl lever, said teeth being beveled so that upon a backward rotation of the rollers the teeth will pass idly over said lever.

10. In an advertising device, the combination of a band having advertisements thereon, two rollers one for each end of the band, electric mechanism for turning said rollers to wind said band in opposite directions, a contact cylinder and connections whereby by rotating said cylinder into different successive positions, said electric mechanism can be made to operate one or the other of said rollers, a ratchet wheel carried by said cylinder, a double-ended lever carrying a pawl for operating said ratchet-wheel, and a latch pivoted in each roller, said latches normally standing above the surfaces of said rollers and when in such position having teeth that are adapted to engage said pawl lever, said rollers being provided with means for securing the ends of said band thereto, said band having a slot near each end that when uncovered, will permit said latch to be thrown outward.

11. In an advertising machine, the combination of a band of advertisements, mechanism for moving said band progressively, means for controlling said mechanism, said controlling means being so constructed that when the band is first moved, it will be moved a short distance to attract attention, and when next moved will be moved a longer distance to bring a new advertisement into view.

In testimony that I claim the foregoing I have hereunto set my hand.

ELIAS ATHERTON LYON.

Witnesses:
EDWIN J. PRINDLE,
LOTTIE M. GARRICK.